March 5, 1957

J. O. SARTO 2,783,658

TRANSMISSION CONTROL SWITCH

Filed March 27, 1953

INVENTOR.
Jorma O. Sarto.
BY
ATTORNEYS

March 5, 1957  J. O. SARTO  2,783,658
TRANSMISSION CONTROL SWITCH
Filed March 27, 1953  4 Sheets-Sheet 3

FIG. 4.

INVENTOR.
Jorma O. Sarto.
BY Harness and Harris
ATTORNEYS.

March 5, 1957

J. O. SARTO 2,783,658

TRANSMISSION CONTROL SWITCH

Filed March 27, 1953

INVENTOR.
Jorma O. Sarto.
BY Harris and Harris
ATTORNEYS.

2,783,658

TRANSMISSION CONTROL SWITCH

Jorma O. Sarto, Walled Lake, Mich., assignor to Chrysler Corporation, Highland Park, Mich., a corporation of Delaware Application March 27, 1953, Serial No. 345,059

24 Claims. (Cl. 74—472)

This invention relates to a transmission control mechanism for an automotive vehicle and more particularly to a means for controlling the initiation of a change in transmission speed ratio.

This invention is particularly adapted to be used with multispeed automotive transmissions having automatic controls for effecting a change in the transmission reduction ratio to adapt the vehicle to various operating conditions. The term "kickdown" is normally used to designate a change from a high speed gear ratio to a lower speed gear ratio.

It is highly desirable to provide automotive transmissions having automatic controls with a means which can be controlled by the operator for effecting a "kickdown" in order to obtain fast acceleration when the operator of the vehicle is confronted with an emergency. Such means may comprise a solenoid actuator to operate the gear shift controls and a switch which is accessible to the operator for closing the circuit which energizes the solenoid.

However, it is considered to be undesirable to allow the transmission to "kickdown" when the vehicle engine speed has exceeded a predetermined critical value. A typical critical engine speed would be, for example, that speed which is required to drive a conventional automotive vehicle with a four-speed automatic transmission at a speed of approximately 55 M. P. H. while the transmission is in "high" gear. A "downshift" occurring at a higher vehicle speed might result in a sudden increase in engine speed and a sharp deceleration of the vehicle.

Accordingly, it has been the practice to provide a means for limiting the operation of the "kickdown" mechanism to those engine speeds below the predetermined critical value. This means usually comprises a mechanism which is responsive to engine intake manifold pressure. One such means is disclosed in the patent to T. M. Ball, No. 2,599,425, wherein a shiftable electrical contact is movable into and out of the line of action of a contact actuating member in response to the rate of gas flow through the venturi of a conventional carburetor throat.

A number of observations are apparent with respect to the operation of the manifold pressure responsive type of "downshift" control. Although it is possible to obtain quite definite operating limits with such controls, the initiation of a downshift occurs at only one predetermined throttle setting. The particular throttle setting selected is the wide open throttle position because if the device is designed to operate at an intermediate throttle setting which is less than the full throttle position, a "kickdown" would be impossible to initiate in those instances where the engine is operating with a throttle position between the intermediate setting and the full throttle position.

It is thus observed that the manifold pressure actuated controls are responsive to two variables, namely, throttle setting and engine speed. The present invention involves a priniciple of operation which is different from that found in the prior art and is responsive only to engine speed. The present invention makes use of vehicle engine coolant pump pressure to control the initiation of a "kickdown." The pump pressure, being proportional to engine speed, is utilized to actuate a transmission control electric circuit interrupting mechanism. When suitably calibrated, the device will function in response to pump pressure to control the downshift at a definite engine speed.

Since the operation of the present invention in controlling the initiation of a "kickdown" or downshift in transmission ratio is not a function of the rate of gas flow through the intake manifold, changes in altitude and in atmospheric conditions will have no adverse effect upon the operating limits.

An object of the present invention is to provide a transmission "kickdown" control mechanism which functions at a fixed predetermined engine speed independent of throttle setting, thereby providing definite operating limits.

Another object of the present invention is to provide a transmission "kickdown" control mechanism which includes a switching means for interrupting a transmission shift control circuit and which further includes a means for eliminating "arcing" at the electrical switching contacts during the opening and closing of the control circuit.

A further object of the invention is to provide a "kickdown control" mechanism which is operative at either the full throttle position or at any intermediate position between the normal operating position and the full throttle position thereby insuring a smoother shift and the elimination of a sudden "surge" of power when a downshift occurs.

Another object of the invention is to provide a transmission "kickdown" control device for use with the shift control mechanism of a multiple speed power transmission, said "kickdown" control device being effective to prevent the initiation of a transmission downshift by said shift control mechanism at transmission input speeds greater than a predetermined limiting value.

Another object of the invention is to provide a transmission "kickdown" control device as set forth in the preceding object which is operatively associated with a transmission particularly adapted to be used with a liquid cooled engine, said "kickdown" control device being operative in response to variations in the pressure of the engine coolant supplied by an engine driven coolant pump to prevent the initiation of a transmission downshift by the shift control mechanism at coolant pressure greater than a predetermined limiting value, said pressure being proportional to engine speed.

Other objects and advantages will be readily apparent to those skilled in the art from the following specification.

This invention is fully described in the following description wherein reference will be made to the accompanying drawings in which:

Figure 4 is a view showing another modified form of

"kickdown" control device in the same general arrangement shown in Figure 3;

Figure 1:
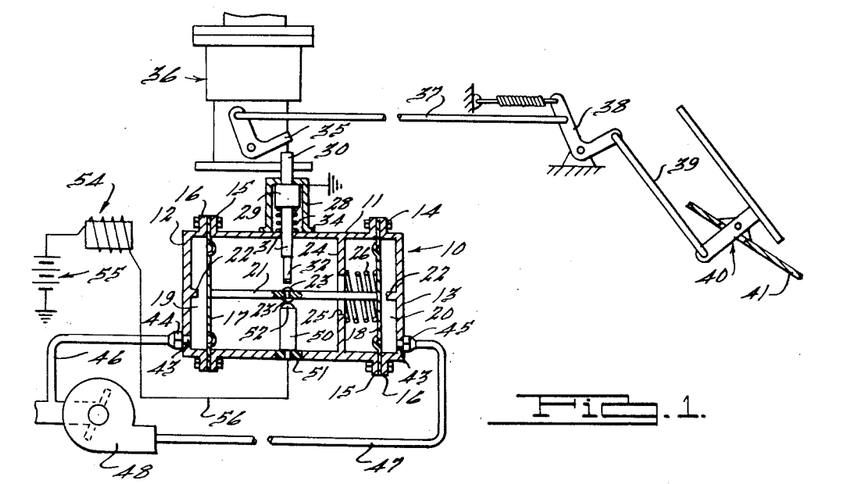
Figure 1 is a cross sectional view of one form of "kickdown" control mechanism together with a schematic view of a throttle linkage switch actuating mechanism.

Referring to Figure 1 in particular detail, the numeral 10 designates generally one form of the kickdown control device of the instant invention, said device including a cylindrical housing 11 having end portions 12 and 13 secured thereto by means of bolts 14 which joins together annular flanges 15 and 16 on the cylindrical housing and end portions respectively. Interposed between the cylindrical housing and each of the end portions 12 and 13 are two flexible diaphragms, 17 and 18 respectively, which partly defines two end chambers, 19 and 20 respectively, at either end of the cylindrical housing. Secured to the center of each of the diaphragms 17 and 18, is a shaft 21 which extends coextensively with the geometric axis of the cylindrical housing and which carries centrally disposed contact elements 23. End portions 12 and 13 each include centrally disposed integral stops 22 which are spaced a predetermined distance from the adjacent diaphragms 17 and 18 to limit the axial deflection of the diaphragms. Located intermediate the diaphragms is an annular flange 24 disposed within and integrally joined to the cylindrical housing 11 and having a central aperture 25 through which shaft 21 extends. Flange 24 provides a seat for compression spring 26 which is interposed between the flange and diaphragm 18 thereby biasing the assembly consisting of shaft 21 and diaphragms 17 and 18 to the right as viewed in Figure 1.

Mounted upon the exterior surface of the cylindrical housing in a suitable manner is guide cylinder 28. A plunger 29 having axial extensions 30 and 31 is disposed within cylinder 28. Secured to extension 31 is an electrode tip 32 which is normally disposed a predetermined distance above the upper contact element 23. Interposed within guide cylinder 28 between plunger 29 and the outer wall of housing 11 is a compression spring 34 which tends to bias the plunger and electrode tip out of contact with upper contact element 23. Extension 30 protrudes through a central opening in the end wall of cylinder 28 and is disposed to be engaged by bell crank lever 35. The bell crank lever is pivotally mounted upon a carburetor generally designated by numeral 36 and is part of the throttle linkage comprising also rod 37 connected at one end to bell crank 35 and at the other end to bell crank 38 and rod 39 connected at one end to bell crank 38 and at the other end to the foot throttle, generally designated by numeral 40, said foot throttle being pivoted to floor board 41.

The end portions 12 and 13 contain apertures 43 for receiving pipe fittings 44 and 45 respectively. Pipe lines 46 and 47 are connected to fittings 44 and 45, respectively, and lead to the engine water pump 48, the pipe 46 being connected to the pump intake side and the pipe 47 being connected to the pump high pressure side. For simplicity, the water pump and pipe line connections to the control device have been represented schematically.

A lower electrode 50 is mounted within housing 11 upon an electrically insulated portion 51 and extends radially inward carrying a hemispherically-shaped tip 52. The tip 52 is normally disposed to contact the lower contact element 23.

A solenoid actuator for the control mechanism is schematically illustrated at 54. The solenoid actuator is energized by means of the battery 55 and the electrical circuit which includes lead 56 extending to lower electrode 50. The battery and the control assembly are both grounded to common parts of the vehicle thereby completing the solenoid-energizing-circuit which is broken only at the gap between electrode tip 32 and contact element 23.

Figure 2:
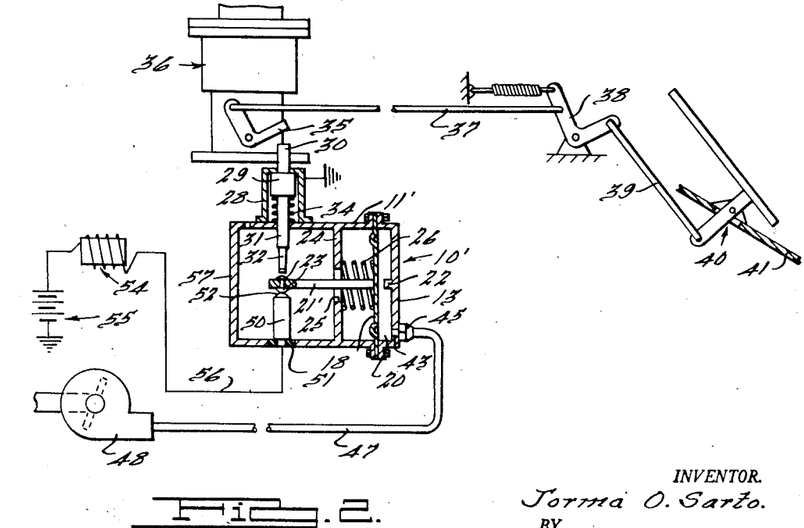
Figure 2 is a cross sectional view of another form of "kickdown" control mechanism together with a schematic representation of a throttle linkage switch actuating mechanism.

Referring to Figure 2, a different embodiment of the invention is illustrated, the kickdown control device being indicated generally by reference numeral 10'. A detailed description of the various component elements is not necessary since the same structural relationship exists between the elements as that which exists between the elements of the embodiments of Figure 1, the corresponding parts being designated by the same numerals. It should be noted, however, that only a single diaphragm 18 is used instead of two, this single diaphragm being received between the cylindrical housing 11' and end portion 13. The shaft 21' is centrally secured at one end to the diaphragm 18 in a cantilever fashion, the other end thereof carrying contact elements 23. Housing 11' is closed at the end opposite the diaphragm 18 by integral wall 57. Chamber 20 communicates with the high pressure side of the engine water pump 48 by means of the line 47 and the fitting 45, as previously described, but the intake side of the pump is not connected to the kickdown device as in the first embodiment.

In the embodiment illustrated in Figure 3, the numeral 110 is used to designate generally a modified "kickdown" control device which comprises cylindrical housing 111 and has attached thereto at either end the portions 112 and 113 which correspond to end portions 12 and 13 previously described with reference to Figure 1. The diaphragms 117 and 118, flange 124, and spring 126 are similar in strucutre and in function to the corresponding elements of the embodiment of Figure 1. Centrally disposed within the housing 111 is a dividing wall 131 having an aperture with a grooved periphery, as shown at 153. A shaft 121 having an offset portion 121' at the center thereof, extends coextensively with the axis of the housing 111 and is centrally secured at either end to the diaphragms 117 and 118. The offset portion 121' of the shaft is adapted to freely pass through an opening 133 in the wall 131.

Figure 3:
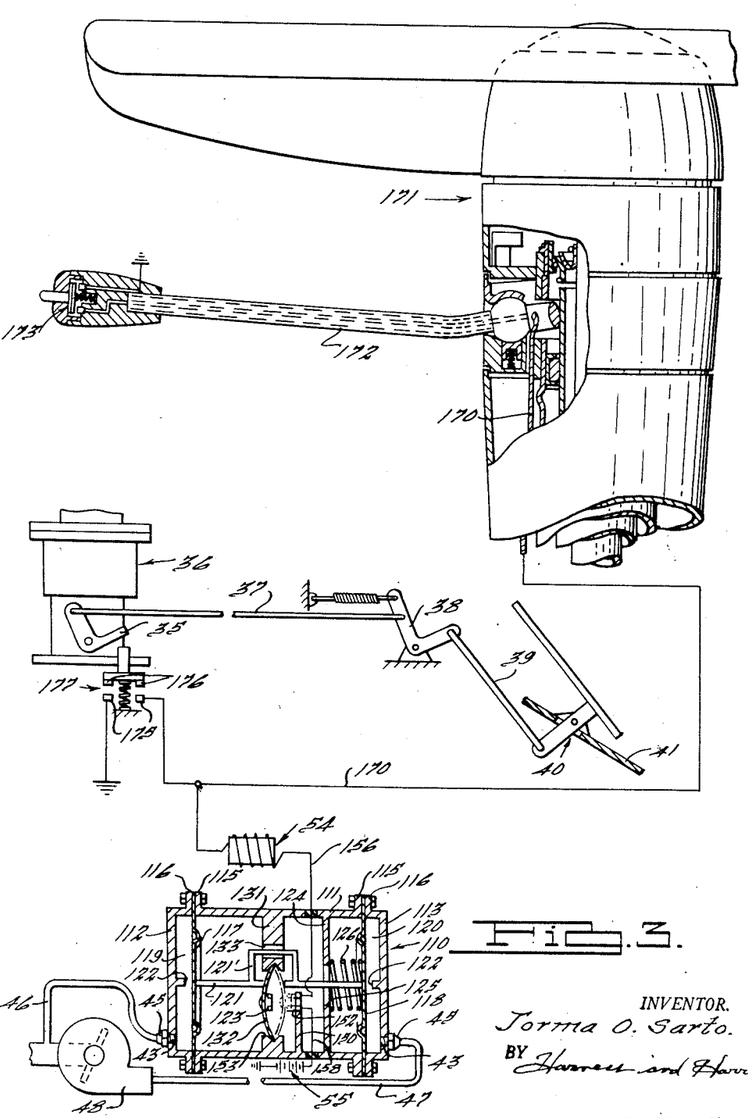
Figure 3 is a view of a steering wheel and hub partly in section showing a "kickdown" control switch together with another modified form of the "kickdown" control device and a schematic representation of a throttle linkage switch actuating mechanism.

A dished flexible steel disc 132 is mounted within the peripheral groove of aperture 153 and is adapted to assume either one of two positions, as shown in Figure 3, one position being that which is indicated by dotted lines, and the other being that which is shown by solid lines. Due to the inherent resiliency of the disc 132, movement from one position to the other takes place very quickly with a "snap" action. This "snap" action makes the positioning of the disc positive and prevents the disc from assuming any intermediate position. Contact elements 123 are carried by disc 132 centrally thereof. Located adjacent to the disc 132 and in a plane parallel to wall 131, is extension 150 which is adapted to carry contact elements 152 in such a position that they are engaged by the contact elements 123 when the disc 132 assumes the position shown by dotted lines in Figure 3. Contact elements 152 are insulated by means of suitable inserts where the contacts are secured to extension 150. The disc 132 is partly disposed within the offset portion 121' and contacts the shaft portion 121 when in either of its two positions as shown in Figure 3.

The engine water pump 48 is connected to chambers 119 and 120 in the end portions 112 and 113 respectively, by means of suitable lines 46 and 47, the high pressure side of the pump being in communication with chamber 120 and the intake side of the pump communicating with chamber 119.

The solenoid shown schematically at 54 is energized by means of battery 55 and the circuit which includes lead 158 leading from the battery to the lower contact element 152 and the lead 156 which leads from upper contact element 152 to the solenoid 54. Solenoid 54, as previously explained, is part of a transmission control mechanism, not shown. Leading from solenoid 54 is a line 170 which is shown schematically as extending to the steering wheel hub, generally designated by numeral 171, through the steering column in a suitable manner. A gear shift lever 172 extends away from the steering wheel hub and carries on the end thereof, a push button switch mechanism 173. Line 170 extends through the gear shift lever 172 to switch 173 which either opens or closes the connection of the line 170 to the ground.

Connected in parallel with switch 173 is another switch generally designated by numeral 177. The schematic representation of switch 177 is shown as comprising fixed contact elements 175, one being grounded and the other connected to line 170 as shown. Mating contacts 176 are adapted to open or close the circuit by means of a switch actuating mechanism consisting of the throttle linkage which includes bell crank 35 pivoted to the carburetor 36, link 37, bell crank 38, link 39, and foot throttle 40.

Figure 4:
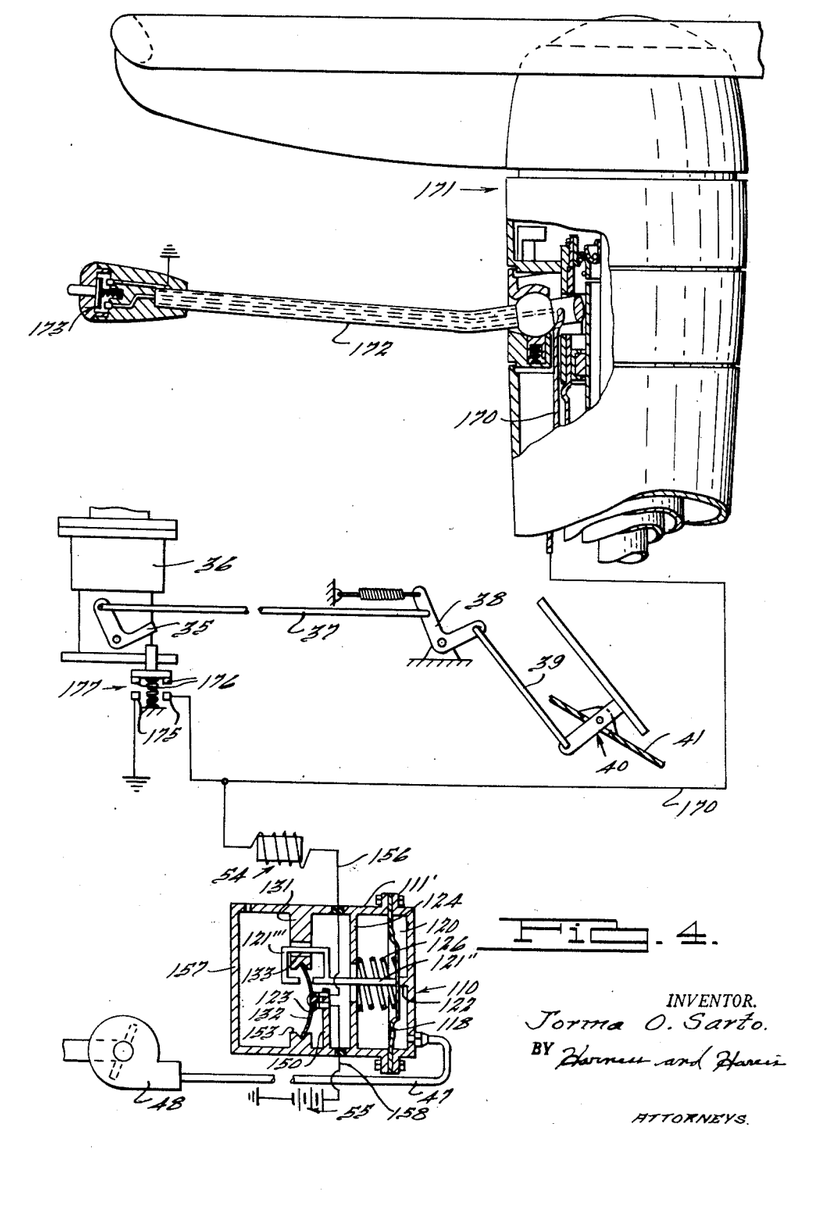

Referring to Figure 4, an embodiment quite similar to that shown in Figure 3 is shown wherein only one diaphragm 118 is employed. The high pressure side of engine water pump 48 is in communication with chamber 120 as in the device of Figure 3, but the intake side of the pump is not connected to the control device. The end of the housing 111' opposite the diaphragm is closed by integral wall 157. The shaft 121" is secured to diaphragm 118 in a cantilever fashion. Shaft 121" has an offset portion 121''' which corresponds in function to the offset portion 121' of the device of Figure 3. The function of the push button 173 at the end of the gear shift lever 172 and of the switch 177 is identical to that of the corresponding parts in the embodiment of Figure 3.

Figure 5:
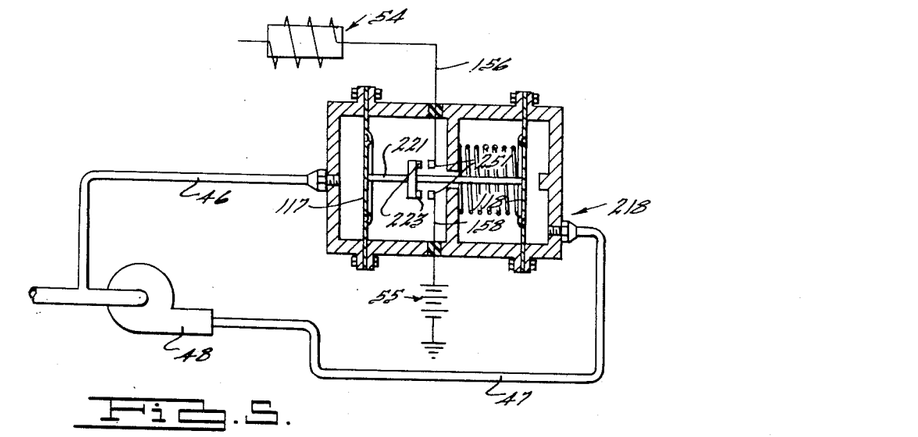
Figure 5 shows another form of control device which is also adapted to be used in the same general organization as that shown in Figure 3.

In the embodiment of Figure 5, the control mechanism generally designated by numeral 218 is adapted to be used in place of the control mechanism 110 of Figure 3. The embodiments of Figures 3 and 5 differ from each other in that the shaft 221 in Figure 5, which corresponds to shaft 121 in Figure 3, carries movable contact elements 223 which are adapted to contact the fixed contact elements 252 upon axial movement of shaft 221, thereby closing the solenoid energizing circuit previously described.

Figures 6, 7:
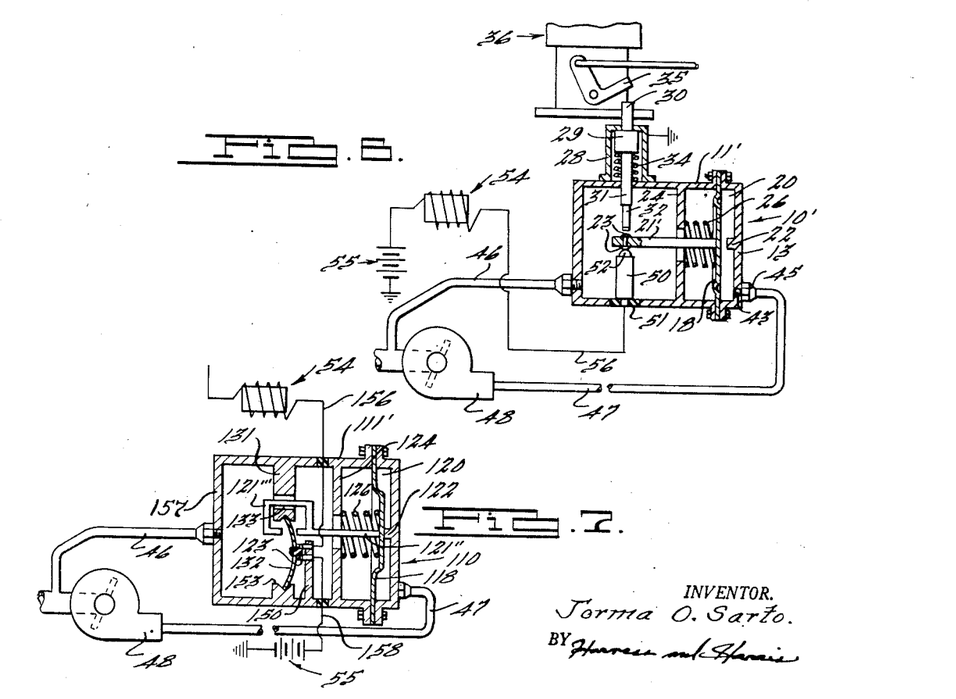
Figure 6 shows still another form of kickdown control device which differs from Figure 2 in that the electrical contact elements are immersed in liquid.
Figure 7 is another form of the invention differing from Figure 4 only in that the electrical contact elements are also immersed in liquid.

Referring to Figure 6, still another embodiment of the invention is shown which is very similar to that shown in Figure 2 except that a line 46 is used to connect the intake side of the pump to the interior of housing 11' thereby immersing the contact points 23 and electrode tips 32 and 52 in the liquid which is bypassed into the housing 111'. Because of the cooling effect of the surrounding water and because of the reduction in the tendency of the contact points to arc, the life of the contact elements is greatly increased.

In the embodiment shown in Figure 7, a line 46 from the intake side of the pump 48 leads to housing 111' and is received in wall 157 by means of a suitable fitting. The structure and function of the control device 110 shown in Figure 7 is identical to the device 110 of Figure 4 in all other respects and hence it is not necessary to describe the embodiment of Figure 7 in more particular detail. It should be noted that the contact elements 123 are completely immersed in liquid thereby reducing the arcing tendency as noted above in the description of the device of Figure 6.

The operation of the invention is apparent from the foregoing description and the drawings, but for the purpose of more particularly setting forth the functional relationship between the component elements, the operation will be explained first with reference to the device of Figure 1.

The foot throttle 40 is depressed by the foot of the operator in the normal operation of the vehicle. The movement of the foot throttle is transferred to bell crank 35 by means of linkage 37, 38, and 39. At any throttle setting less than the wide open throttle position, the bell crank 35 will not contact extension 30. Should the operator encounter an emergency situation which would require a high rate of acceleration of the vehicle, the operator may "tramp down" on the foot throttle to the wide open throttle position thereby causing bell crank 35 to contact and depress extension 30 and the integral plunger 29 and extension 31 against the compressive force of spring 34. The downward movement of extension 31 carries the electrode tip 32 to contact the upper contact element 23 thereby closing the solenoid energizing circuit which permits solenoid actuator 54 to initiate a downshift or "kickdown" to a lower gear. However, if the vehicle is traveling at a speed greater than a predetermined critical speed, it is undesirable to have a "kickdown" occur for the reasons previously set forth. Accordingly, the high pressure side of the engine water pump 48, the pressure head of which is a function of engine speed, is connected to chamber 20. The low pressure side is connected to chamber 19. The positive pressure in chamber 20 together with the negative pressure in chamber 19 is sufficient at speeds above the critical to cause the assembly consisting of flexible diaphragms 17 and 18, shaft 21, and contact elements 23 to shift to the left as viewed in Figure 1. The stops 22 are positioned to prevent harmful over-deflection of the diaphragm. It is thus seen that the solenoid circuit is opened and the solenoid-actuated transmission control mechanism will not be operated upon full depression of the foot throttle thus making the initiation of a "kickdown" at excessive engine speeds impossible.

The operation of the device of Figure 2 is similar to that of Figure 1 except for the fact that the deflection of the single diaphragm 18 is due only to the positive pressure within chamber 20. This device may also be calibrated to prevent "kickdown" above a predetermined control speed just as with the device of Figure 1.

In the operation of the device of Figure 3, the throttle linkage is actuated by the foot of the operator as in the operation of the device of Figures 1 and 2. At any position less than full throttle position, the movement of bell crank is insufficient to cause the switch 177 to close. Under normal operation at speeds lower than the critical speed the dished flexible steel disc 132 assumes the position shown by dotted lines in Figure 3 thereby causing the contact elements 123 and 152 to engage each other. When the throttle reaches the wide open position, the bell crank 35 causes the switch 177 to become depressed thereby closing the solenoid circuit and causing a downshift or "kickdown" to be initiated. If the vehicle is traveling at a speed above the critical, the positive pressure in chamber 120 from the high pressure side of the water pump and the negative pressure in chamber 119 from the low pressure side of the water pump combine to cause shaft 121 and bypass 121' to shift to the left. Upon movement to the left, as shown in Figure 3, the shaft 121 contacts disc 132 and causes it to "snap" into the position shown in solid lines thereby causing contact elements 123 and 152 to disengage. Upon the subsequent closing of the switch 177 while the engine continues to operate at speeds greater than the critical speed, the solenoid 54 will not be energized.

In the embodiment of Figure 3, it is also possible to initiate a "kickdown" at throttle position less than the wide open throttle position by closing the switch 173 at the end of the gear shift lever. This makes it possible for the operator to initiate a downshift or "kickdown" and to then apply engine power by further depression of the throttle. This sequence of operation will result in a smoother ride and will avoid the sudden surge of power which would result when the engine throttle is first opened to the wide open position before the "kickdown" is initiated. With the embodiment of Figure 3, it is therefore to be observed that the foot throttle switch 177 is merely used to initiate a "kickdown" when the operator is confronted with an emergency requiring a fast rate of acceleration. Under normal conditions, however, it would be desirable to use only the push button switch mechanism 173. Whether or not switch 173 or switch 177 is used, the flexible disc 132 is effective to break the solenoid circuit at speeds above the critical and thus prevent either switch from energizing the circuit.

The operation of the device of Figure 4 is identical with that of the device shown in Figure 3 except that the shaft 121″, which corresponds to shaft 121 in the device of Figure 3, is caused to move axially by only the single diaphragm 118 in response to the liquid pressure in chamber 120.

The operation of the device shown in Figure 5 is the same as that of the device shown in Figure 3 except for the fact that the contact elements 223 are moved more slowly into and out of engagement with the fixed contacts 252 than the corresponding contacts shown in Figure 3.

The operation of the device shown in Figures 6 and 7 is the same as that of the devices shown in Figures 2 and 4 respectively.

In regard to the relative merits of the various forms of the invention, several obvious conclusions may be made. The devices of Figures 6 and 7, for example, have an advantage over the corresponding structures of Figures 2 and 4, respectively, in that the contact elements of the former will have less tendency to arc due to the fact that the contacts are constantly submerged in liquid and therefore the tendency of the contact elements to become pitted and corroded is reduced. Further, the forms of the invention employing a spring disc for obtaining a snap action of the switching elements into and out of electrical contact offer an advantage over the forms in which the circuit is opened and closed more slowly in that any arc which might be created in the former will be of relatively short duration.

The forms of the invention which make use of the flexible diaphragms on either side of the circular housing offer an advantage over those forms using only one diaphragm in that the device is thereby rendered responsive to the pressure differential across the water pump instead of being responsive to total head. This factor becomes of importance when the control device is used on vehicles using a pressurized liquid cooling system. It is readily observed that the critical speed at which the "kickdown" control device would operate will vary according to the magnitude of the pressure in the engine radiator or low pressure side of the water pump. Thus, if a "kickdown" control device of the single diaphragm-type is calibrated to respond at a given speed when the engine is warm and when the cooling system is fully pressurized, the actual speed at which the "kickdown" control device will become effective when the engine is cool will be higher than the predetermined critical. Conversely, if the device is calibrated for a "cool engine," it would become effective to prevent a kickdown at speeds less than the predetermined critical. This objection is overcome, however, when the electrical contact elements are moved in response to the pressure on both the high and low pressure side of the water pump as in the embodiments employing two flexible diaphragms. Since such a device is responsive only to pressure differential, it is immaterial how much the cooling system is pressurized.

The forms of the invention in which a normal push button switch mechanism is used to initiate a "kickdown" have the obvious advantage of providing a means for "kicking down" to a lower gear ratio without the need for opening the throttle to the wide open position.

All of the disclosed forms of the invention operate in response to engine water pump pressure which is dependent upon engine speed alone, thus making it possible to calibrate the "kickdown" control device to function at all times at substantially the same speed regardless of the road load requirements.

This invention may readily be used in any type of automatic multispeed transmission with a minimum of alteration being required to adapt it to a particular installation. One suitable type of transmission is that disclosed in U. S. Patent No. 2,348,763.

Other modifications of the disclosed invention will be apparent to persons skilled in the art and may readily be made without departing from the scope of the present invention.

What I claim is:

1. In a multispeed automatic transmission for use with a liquid-cooled engine and having an electrical control circuit, a transmission downshift control for regulating the initiation of a downshift comprising a closed housing, two flexible diaphragms secured within said housing in spaced relationship and forming with said housing an intermediate chamber between said diaphragms and a pressure chamber on either side of said intermediate chamber, a high pressure engine coolant pipe line in communication with one of said pressure chambers, a low pressure engine coolant pipe line in communication with the other of said pressure chambers, a shaft extending through said intermediate chamber and secured centrally to said diaphragms, a dished spring disc secured at its periphery to said housing within said intermediate chamber and adapted to assume either one of two operative positions, electrical contact elements carried by said disc, a mating contact element fixedly mounted to said housing and adapted to be engaged by said first-named contact elements when said disc is in one of the two said operative positions thereby closing said electrical control circuit, said shaft being adapted to move said disc into either of the two said operative positions when said diaphragms are deflected in response to engine coolant pressure variations.

2. In a multispeed automatic transmission for use with a liquid-cooled engine and having an electrical control circuit, a transmission downshift control for regulating the initiation of a downshift comprising a housing, at least one diaphragm mounted within said housing, an axially extending shaft secured to one side of said diaphragm, electrical contact elements carried by said shaft, an electrode fixed to said housing internally thereof extending radially with respect to the axis of said housing, another radially extending electrode slidably retained by said housing and opposed to the first said electrode, said electrodes including tips in close proximity to said contact elements, the second said electrode being adapted to be moved into contact with one of said contact elements thereby closing said electrical control circuit, and an engine coolant pressure line connected to said housing on the other side of said diaphragm, said contact element being moved out of close proximity to said electrode tips upon deflection of said diaphragm in response to engine coolant pressure.

3. In a multispeed automatic transmission for use with a liquid-cooled engine and having an electrical control circuit, a transmission downshift control for regulating the initiation of a downshift comprising a housing, two spaced diaphragms mounted within said housing, a shaft interconnecting said diaphragms, a contact element carried by said member, an electrode fixed to said housing internally thereof and extending transversely with respect to the axis of said shaft, another transversely extending electrode slidably retained by said housing, said other electrode being opposed to the first said electrode, said electrodes including tips in close proximity to said contact element, the second said electrode being adapted to be moved into contact with said contact element thereby closing said electrical control circuit, and engine coolant pressure lines connected to said housing on opposed sides of said diaphragm, said contact elements being moved out of close proximity to said electrode tips upon deflection of said diaphragm in response to variations in engine coolant pressure.

4. In a multiple speed automatic transmission for use with an engine powered vehicle having an engine driven fluid pressure pump, said transmission having an electrical shift control circuit, a transmission downshift control for regulating the initiation of a downshift comprising a housing, at least one flexible diaphragm mounted within said housing, an electrical control circuit breaker disposed within said housing on one side of said diaphragm which includes a shaft secured to said diaphragm and extending axially with respect to said housing, means for subjecting the other side of said diaphragm to engine driven pump pressure thereby causing the circuit breaker to open the transmission electrical shift control circuit in response to variations in engine speed, said electrical control circuit breaker comprising a dished flexible disc secured at its periphery to said housing and adapted to assume either one of the two axial positions, electrical contact elements carried by said disc, a mating contact element fixedly mounted to said housing and adapted to be engaged by said first-named contact elements when said disc is in one of the two said axial positions thereby closing said electrical shift control circuit.

5. In a multiple speed automatic transmission for use with a liquid cooled engine for powering a vehicle, said engine including an engine coolant pump, a transmission shift mechanism for obtaining various transmission speed ratios, and an electrical circuit means for energizing said shift mechanism; a transmission downshift control device comprising a pair of fluid pressure chambers, a movable member having portions partly defining said pressure chambers, conduit means for connecting one of said pressure chambers to the discharge side of said pump and for connecting the other of said pressure chambers to the intake side of said pump, a switching mechanism having portions operatively connected to said movable member, said mechanism forming a portion of said electrical circuit means and being adapted to open and close the same upon movement of said movable member, said movable member being adapted to actuate said switching mechanism and to open said circuit means when the engine coolant pump pressure differential is greater than a predetermined value.

6. In a multiple speed transmission for use with a liquid cooled engine for powering a driven member, said engine including an engine driven liquid coolant pump for producing a coolant pressure, and means for effecting a shift from one transmission speed ratio to another; a downshift control device comprising a pair of fluid working chambers, a movable member having portions partly defining each of said working chambers, control means for rendering inoperative the above-mentioned means for effecting a speed ratio shift, conduit structure connecting one of said working chambers to the discharge side of said pump and for connecting the other of said working chambers to the intake side of said pump, said control means having portions thereof connected to said movable member, said control means being rendered operative in response to an increase in coolant pressure differential across said pump to a value which exceeds a predetermined maximum.

7. In a multiple speed automatic transmission for use with an engine and having an electrical shift control circuit, said engine having a fluid pressure pump drivably connected thereto for providing a control pressure; a transmission downshift control for regulating the initiation of a downshift comprising a closed housing, two flexible diaphragms secured within said housing in axially spaced relationship forming with said housing an intermediate chamber between said diaphragm and a pressure chamber on either side of said intermediate chamber, a high pressure pump delivery line in communication with one of said pressure chambers, a low pressure pump supply line in communication with the other of said pressure chambers, a control member secured to each of said diaphragms, a flexible member positioned within said intermediate chamber and adapted to assume either of two positions, a first electrical contact element carried by said flexible member, and a mating contact element anchored adjacent said first contact element and adapted to be engaged thereby when said flexible member assumes one of said two positions, said contact elements being disengaged when said flexible member assumes the other of said positions, said contact elements forming a portion of said electrical shift control circuit, said member being adapted to move said flexible member into either of said two positions when said diaphragms are moved in response to variations in pump pressure differential.

8. In a multiple speed automatic transmission for use with a liquid cooled engine and having an electrically operated gearshift mechanism, an electrical circuit means for energizing said gearshift mechanism, an engine driven coolant pump for producing coolant pressure; a transmission downshift control for regulating the initiation of a downshift comprising a circuit breaker means for opening and closing said electrical circuit means, conduit means interconnecting said breaker means and said coolant pump, and means responsive to coolant pressure differential across said pump for actuating said circuit breaker means and to render said shift mechanism inoperative when said pressure differential exceeds a predetermined maximum value.

9. In a multiple speed automatic transmission for use with a vehicle engine, a gearshift mechanism, an electrical circuit means for energizing said gearshift mechanism, and an engine driven pump for providing a control pressure; a transmission downshift control for regulating the initiation of a downshift by said gearshift mechanism comprising a housing; a pair of pressure chambers within a portion of said housing, a flexible diaphragm member having portions partly defining each of said pressure chambers, a circuit breaker mechanism disposed within another portion of said housing having portions thereof connected to said diaphragm member, said circuit breaker means being adapted to open and close said electrical circuit means, and conduit means for connecting the discharge side of said pump to one pressure chamber and for connecting the intake side of said pump to the other pressure chamber, said diaphragm member being effective to actuate said circuit breaker mechanism to open said electrical circuit when said control pump pressure differential exceeds a predetermined value; said circuit breaker mechanism comprising a dished flexible disc secured at its periphery to said housing and adapted to assume either of two operative positions, an electrical contact element carried by said disc, and a mating contact element secured to a stationary member within said housing and adapted to be engaged by said first named contact element when said disc is in one of said operative positions thereby closing said electrical circuit means, said diaphragm member being effective to actuate said circuit breaker mechanism to open said electrical circuit by deflecting said flexible disc to the other operative position when the control pressure differential across said pump exceeds a predetermined value.

10. In a multiple speed automatic transmission for use with an engine having an engine driven fluid pump, said transmission including an electrical shift control circuit, a transmission downshift control for regulating the initiation of a downshift comprising a housing, two axially spaced diaphragms mounted within said housing, an axially extending member interconnecting said diaphragms, a contact element carried by said member, an electrode fixed to said housing internally thereof, another electrode slidably mounted within said housing in juxtaposition with respect to the first said electrode, said electrodes including portions in close proximity to said contact element, the other of said electrodes being adapted to be moved into electrical contact with said contact element thereby closing said electrical shift control circuit, pump pressure conduits connected to said housing on opposed sides of said diaphragm member, said contact element being moved out of close proximity to said electrode portions upon deflection of said diaphragm member in response to variations in the magnitude of the pressure differential across said pump.

11. In a multiple speed transmission for use with an engine powered vehicle having an engine driven fluid pump, said transmission including a shift mechanism for obtaining various transmission speed ratios and an electrical circuit means for energizing said shift mechanism; a transmission downshift control device comprising a pair of fluid pressure chambers, a movable member having spaced wall portions thereon, said wall portions each respectively defining in part individual ones of said pressure chambers; first electrical contact means carried by said movable member intermediate said spaced portions, other electrical contact means disposed in fixed proximate relationship with respect to said first electrical contact means, each of said electrical contact means forming a portion of said electrical circuit means, and conduit structure for connecting each of said pressure chambers to opposite sides of said pump, said movable member being shifted in response to variations in pressure differential across said pump to move said first and said other contact means into and out of engagement to open said electrical circuit means at engine speeds within a predetermined range of values.

12. In an automotive vehicle having an engine, a multiple speed power transmission for transmitting power from said engine, an engine throttle linkage mechanism operatively connected to said engine, a gear shifting mechanism having portions operatively connected to said transmission for varying the operating speed range of the same, said transmission including a transmission shift control device, and an electric circuit means for energizing said shift control device; a circuit breaker means including relatively movable switching elements, means responsive to the speed of said engine and cooperable with said switching elements to move the same into and out of contacting relationship in response to variations in the operating speed of said engine for respectively closing and opening said electric circuit means, a first electric switch in said circuit means having portions thereof connected to said throttle linkage mechanism and adapted to close said circuit means upon movement of said throttle linkage mechanism to a predetermined setting when said switching elements are in contacting relationship, and a second electric switch in said circuit means disposed in parallel relationship with respect to said first switch and adapted to be carried by said gear shifting mechanism, said second switch being effective to close said circuit means independently of the setting of said throttle linkage mechanism when said switching elements are in contacting relationship.

13. In an automotive vehicle having a liquid cooled engine, said engine having an engine powered coolant pump, a multiple speed power transmission for transmitting power from said engine, an engine throttle linkage mechanism operatively connected to said engine, a gear shifting mechanism having portions operatively connected to said transmission for varying the operating speed range of the same, said transmission including a transmission shift control device, and an electric circuit means for energizing said shift control device; a circuit breaker means including relatively movable switching elements adapted to move into and out of contacting relationship for respectively closing and opening said electric circuit means, a first electric switch in said circuit means having portions thereof connected to said throttle linkage mechanism and adapted to close said circuit means upon movement of said throttle linkage mechanism to a predetermined setting when said switching elements are in contacting relationship, and a second electric switch in said circuit means disposed in parallel relationship with respect to said first switch and adapted to be carried by said gear shifting mechanism, said second switch being effective to close said circuit means independently of the setting of said throttle linkage mechanism when said switching elements are in contacting relationship, said circuit breaker means including a pair of fluid pressure chambers, fluid pressure actuated means cooperable with said switching elements to move the same into and out of said contacting relationship, and conduit means operatively connecting said pressure actuated means to opposite sides of said pump.

14. In a multiple speed transmission for use with an engine for powering a driven member, said engine including an engine driven liquid pumping unit for producing a control pressure, a transmission control means for effecting a shift from one transmission speed ratio to another and an electrical circuit for energizing said control means; a downshift control device comprising a fluid working chamber, a movable member partly defining said working chamber, switching means for rendering inoperative the above-mentioned control means comprising a portion of said electrical circuit, said switching means including movable contact elements connected to said movable member and second contact elements in said circuit adapted to be engaged by said movable contact elements, conduit means for interconnecting said working chamber and said pumping unit and for conducting liquid to the vicinity of said contact elements for submerging the same, said switching means being actuated in response to an increase in control pressure differential across said pump to a value which corresponds to engine speeds greater than a predetermined limiting value.

15. The combination as set forth in claim 8 wherein said conduit means includes a branch portion for supplying liquid to the vicinity of said breaker means to submerge the same.

16. In a multiple speed automatic transmission for use with an engine having an engine driven fluid pump, said transmission having an electrical shift control circuit, a transmission downshift control for regulating the initiation of a downshift comprising a housing, at least one movable member mounted within said housing and defining therewith a fluid pressure chamber, a switching element secured to said movable member, an electrical contact element carried by said switching element, an electrical conductor fixed to said housing adjacent said contact element, another electrical conductor slidably mounted in said housing, portions of said conductors being in close proximity upon movement of said movable conductor in one direction, conduit means for connecting said pressure chamber to said pump, said conductors each forming a portion of said shift control circuit, said contact element normally providing an electrical connection between said conductors upon movement of said movable conductor in said one direction, said movable member being adapted to move said switching element and said contact element upon an increase in engine speed beyond a predetermined speed range thereby preventing an electrical connection between said conductors.

17. In a multispeed automatic transmission for use with a liquid cooled engine and having a solenoid actuated shift mechanism, a transmission downshift control for regulating the initiation of a downshift comprising a housing, solenoid circuit breaker means disposed within said housing, means responsive to engine liquid coolant pump pressure for opening and closing said solenoid circuit breaker means thereby allowing said shift mechanism to operate only when the engine coolant pump pressure is less than a predetermined value, said means for opening and closing said solenoid circuit breaker means including flexible diaphragms mounted in spaced relationship within said housing at each end thereof, and said circuit breaker means including a shaft extending between said diaphragms within said housing, said shaft being centrally secured at the ends thereof to said diaphragm, electrical contact elements carried by said shaft intermediate the ends thereof, a mating contact element secured to said housing internally thereof in spaced relationship with respect to said first named contact elements, the first named contact elements being adapted to move into engagement with the said mating contact elements upon deflection of the diaphragms.

18. In a multiple speed power transmission for use in the driving power delivery path of an automotive vehicle, said transmission including a downshift mechanism and an electric circuit means for energizing the same, a transmission downshift control device comprising a switching means for opening and closing said circuit means, said switching means including a pair of series connected switches forming a portion of said circuit means, a fluid pump drivably connected to a portion of said power delivery path, and means responsive to variations in fluid pressure differential across said pump for actuating one of said series connected switches.

19. In a multiple speed power transmission for use in the driving power delivery path of an automotive vehicle, said transmission including a downshift mechanism and an electric circuit means for energizing the same, a transmission downshift control device comprising a switching means for opening and closing said circuit means, said switching means including a pair of series connected switches forming a portion of said circuit means, a fluid pump drivably connected to a portion of said power delivery path, a pressure responsive actuator connected to one of said series connected switches and fluid pressure passages interconnecting said actuator with opposite sides of said pump for transmitting a pump pressure differential signal to said actuator thereby causing the latter to open said one switch at vehicle speeds within a predetermined speed range.

20. In a multiple speed automatic transmission for use with an engine powered automotive vehicle, said transmission forming a part of a power delivery path between the vehicle engine and a vehicle power output member, an electrically operated transmission downshift mechanism, an electrical circuit means for energizing said downshift mechanism, a fluid pump drivably connected to a portion of said power delivery path, a transmission downshift control for regulating the initiation of a downshift comprising a circuit breaker means and an operator controlled switch disposed in series and forming a portion of said circuit means, a pressure responsive actuator connected to said breaker means, and a fluid connection between said actuator and opposite sides of said pump for transferring a control pressure differential to the former, said actuator responding to pump pressure differential in excess of a predetermined value to actuate said breaker means to an open circuit position thereby preventing the initiation of a transmission downshift at relatively high vehicle speeds.

21. In a multiple speed automatic transmission for use with a vehicle engine having a fluid pressure pump drivably connected thereto, said transmission including a transmission shift mechanism for obtaining various transmission speed ratios, and an electrical circuit means for energizing said shift mechanism; a transmission downshift control device comprising a pair of fluid pressure chambers, a movable member having portions partly defining said pressure chambers, conduit means for connecting one of said pressure chambers to the discharge side of said pump and for connecting the other of said pressure chambers to the intake side of said pump, a switching mechanism having portions operatively connected to said movable member, said mechanism forming a portion of said electrical circuit means and being adapted to open and close the same upon movement of said movable member, said movable member being adapted to actuate said switching mechanism and to open said circuit means when the pump pressure differential assumes a value within a preselected range.

22. In a multiple speed transmission for use with an engine having a fluid pressure pump drivably connected thereto for providing a control pressure, said transmission including means for effecting a shift from one transmission speed ratio to another; a downshift control device comprising a pair of fluid working chambers, a movable member having portions partly defining each of said working chambers, control means for rendering inoperative the above-mentioned means for effecting a speed ratio shift, conduit structure connecting one of said working chambers to the discharge side of said pump and for connecting the other of said working chambers to the intake side of said pump, said control means having portions thereof connected to said movable member, said control means being rendered operative in response to an increase in fluid pressure differential across said pump to a value which exceeds a predetermined maximum.

23. In a multiple speed automatic transmission for use with an engine powered vehicle and having an electrically operated gearshift mechanism, an electrical circuit means for energizing said gearshift mechanism, and an engine driven fluid pump for producing control pressure; a transmission downshift control for regulating the initiation of a downshift comprising a circuit breaker means for opening and closing said electrical circuit means, conduit means interconnecting said breaker means and said pump for transmitting a control pressure signal to the former, and means responsive to the control pressure signal for actuating said circuit breaker means and to render said shift mechanism inoperative when said pressure signal assumes a value within a preselected range.

24. In a multiple speed power transmission for use in the driving power delivery path of an automotive vehicle, said transmission including a downshift mechanism and an electric circuit means for actuating the same, a transmission downshift control device comprising switching means in said circuit means effective to cause the latter to actuate said downshift mechanism, and a fluid pump drivably connected to a portion of said power delivery path, said control device also comprising means responsive to a predetermined fluid pressure of said pump to render operation of said switching means ineffective to cause actuation of said downshift mechanism by said circuit means.

References Cited in the file of this patent

UNITED STATES PATENTS

| | | |
|---|---|---|
| 1,838,096 | Fleischel | Dec. 29, 1931 |
| 1,993,544 | Fleischel | Mar. 5, 1935 |
| 2,051,553 | Fleischel | Aug. 18, 1936 |
| 2,548,138 | Ball | Apr. 10, 1951 |
| 2,554,314 | Price | May 22, 1951 |
| 2,566,631 | Price | Sept. 4, 1951 |
| 2,606,456 | Dodge | Aug. 12, 1952 |